No. 730,618. PATENTED JUNE 9, 1903.
J. A. DONALDSON
HOLDBACK HOOK FOR VEHICLE SHAFTS.
APPLICATION FILED MAR. 3, 1903.

NO MODEL.

Witnesses
Inventor
James A. Donaldson,
by
his Attorneys

No. 730,618. Patented June 9, 1903.

UNITED STATES PATENT OFFICE.

JAMES A. DONALDSON, OF GREENVILLE, PENNSYLVANIA.

HOLDBACK-HOOK FOR VEHICLE-SHAFTS.

SPECIFICATION forming part of Letters Patent No. 730,618, dated June 9, 1903.

Application filed March 3, 1903. Serial No. 146,900. (No model.)

*To all whom it may concern:*

Be it known that I, JAMES A. DONALDSON, a citizen of the United States, residing at Greenville, in the county of Mercer and State of Pennsylvania, have invented certain new and useful Improvements in Holdback-Hooks; and I do hereby declare the following to be a full, clear, and exact description of the invention, such as will enable others skilled in the art to which it appertains to make and use the same.

This invention relates to horse-detaching devices, and particularly to holdback or breeching hooks for use in connection with devices for detaching the traces of a horse from the swingletree.

The principal object of the invention is to provide an exceedingly simple, neat, and inexpensive device of such character which will prevent detachment of the holdback or breeching so long as the horse is harnessed for driving, but will easily allow the holdback to be detached from the shafts when the traces are released from the swingletree.

Figure 1:
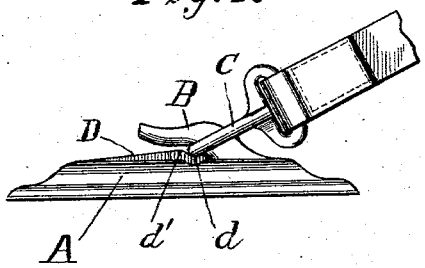
Figure 2:
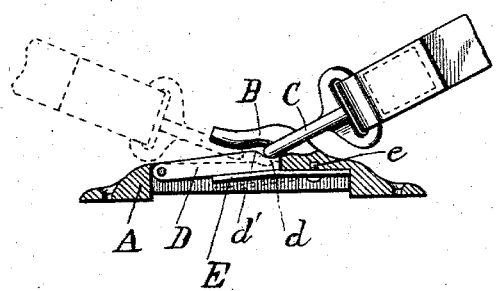

In the accompanying drawings, which are to be taken as a part of this specification, Figure 1 is a side view of my improved device; and Fig. 2 is a similar view, partly in section, and with dotted lines indicating the mode of detachment of the holdback.

My improved device consists principally of an elongated plate or block mounted on the vehicle-shaft, having a forwardly-projecting hook which is engaged by a ring or loop at the end of the holdback or breeching strap, said loop being normally retained on the hook by a spring-pressed tongue or finger located in a slot beneath the hook. Two of such devices are of course employed, one on each shaft.

The letter A denotes the said plate or block, having suitable apertures for the fastening-screws at its ends and having rising therefrom and integral therewith a short forwardly-projecting hook B, the front part of which curves slightly downward, so as to leave a slight upcurve at the back part of the hook. This hook is engaged by the ring or loop C at the end of the holdback-strap. Beneath the hook the plate or block A has a longitudinal slot, and lying therein is a tongue or finger D, pivoted at its front end and having its rear end spring-pressed upwardly out of the slot and against the ring or loop C. A flat spring E is here shown, secured by a screw *e* to a recessed under side of the plate or block directly beneath the base of the hook B. The rear extremity of the tongue D is preferably notched or beveled, as at *d*, and the loop C is confined between such notch or beveled part and the upcurved part of the hook, while a shoulder *d'* is left directly in front of such notch or beveled part to hold the loop back in place on the hook. When the traces of the horse are released from the swingletree and the horse moves forward, the loop C pulls off the hook, riding over the shoulders *d'* and depressing the tongue, as indicated in dotted lines in Fig. 2. I thus provide a very simple and inexpensive device, which is also attractive and neat in design and which is efficient in use, preventing the loop from slipping off the hook except when the holdback-strap is pulled forward, when it slips off very readily.

It will be observed that the upper edge of the tongue constitutes a gradual incline, by means of which the tongue can be easily depressed and the loop easily placed on the hook, while the notched or beveled part *d*, which lies above the pivot of the tongue, also permits the tongue to be depressed very easily when the loop is pulled off the hook.

Having thus fully described my invention, what I claim as new, and desire to secure by Letters Patent of the United States, is—

The herein-described holdback device, consisting of an elongated plate or block, adapted to be mounted on a vehicle-shaft, and having a short hook rising therefrom and projecting horizontally forward, over which hook a loop or ring on the breeching may be passed; a longitudinal slot in said plate under and in front of the forwardly-projecting part of the hook, a tongue lying therein pivoted at its forward end, and a flat spring under said tongue pressing it upward with its upper edge above the top surface of said plate, said upper edge being gradually upwardly inclined rearward and slightly notched or beveled at its rear end to accommodate and confine the loop or ring between such rear end and the back part of the hook.

In testimony whereof I affix my signature in presence of two witnesses.

JAMES A. DONALDSON.

Witnesses:
A. H. BURNETT,
H. E. HOENE.